United States Patent Office 3,594,226
Patented July 20, 1971

3,594,226
SUPERCONDUCTORS
David Brynmor Thomas, Abingdon, England, assignor to Science Research Council, London, England
No Drawing. Filed Oct. 23, 1967, Ser. No. 677,025
Claims priority, application Great Britain, Oct. 31, 1966, 48,777/66
Int. Cl. B44d 1/18
U.S. Cl. 117—228
2 Claims

ABSTRACT OF THE DISCLOSURE

A superconducting cable consists of multiple strands of carbon fibre coated with a superconductor. The strands may be woven to form a tube and the tube encapsulated to form a rigid coil capable of carrying a cyrogenic fluid.

BACKGROUND OF THE INVENTION

This invention relates to superconductors and to electrical arrangements including superconductors.

The first superconducting coils that were built used wire consisting only of superconducting material. It was found, however, that the performance of such coils was seriously degraded by unpredictable premature transition of the superconductor to the normal (non-superconducting) state. In order to overcome this problem various forms of composite electrical conductor have been used. These composite conductors comprise a superconductor in intimate contact throughout its length with a normal conductor of high conductivity, the normal conductor acting as a shunt when a transient instability causes a portion of the superconductor to become normal. When the transient has ended the normal portion of the superconductor becomes superconducting again and the current returns to it. The normal conductor usually is copper or aluminium.

Where a big coil is to generate a magnetic field of high strength, say about 50 kilogauss or more, this arrangement is not satisfactory. The main problem arises because the magnetic field results in mechanical forces, in particular hoop stress so great that a deformation of the copper (or aluminium) occurs. This in itself is serious, but even more serious is the fact that the superconductor, which in comparison with the copper is usually either extremely brittle or extremely strong, is very likely to be damaged or broken when the copper deforms.

It is therefore an object of the present invention to provide a new or improved form of composite electrical conductor.

SUMMARY OF THE INVENTION

According to the present invention, a composite electrical conductor comprises a carbon fibre coated with a layer of superconductor.

A cable in accordance with the invention may comprise a multiplicity of such composite conductors which may, for example, be laid parallel, twisted together, or woven, like fabric, to form a tape, sheet or tube. The layer of superconductor may be applied to the carbon fibres before or after weaving. Where the fibres are woven into a tube, this conveniently forms a passage through which the cryogenic coolant necessary to maintain the superconductor at the desired low temperature is passed.

The superconductor may be niobium/tin ($Nb_3Sn$) which may be vapour deposited on the fibres.

EMBODIMENTS OF THE INVENTION

Various embodiments of the present invention will now be described by way of example.

The basic embodiment is a composite electrical conductor comprising a carbon fibre coated with a superconductor. A preferred fibre is one having maximum tensile strength and stiffness. Such fibres consist of small crystallites of graphite bonded together with their $a$ axes parallel to the axis of the fibre. The fibre has a diameter of 5–10 microns and is coated with a layer of niobium/tin ($Nb_3Sn$) some 500 A. units thick by a vapour deposition process. The thickness of the coating may be varied within wide limits but practical upper and lower limits are believed to be in the region of 10,000 and 50 A. respectively.

In use of the composite conductor the carbon fibre forms the normal conductor to which the current transfers in the event of a transient normality of the superconductor. The particular advantage of a carbon fibre is its high tensile strength, its high Young's modulus (stiffness), and its low electrical resistivity at temperatures in the region of 4° K. even in the presence of high mechanical stress and a magnetic field of high strength.

Clearly a single coated fibre will not normally form a usable conductor and in practice a multiplicity of carbon fibres will be used to form a cable. Depending on the requirements, the fibres may be laid parallel, twisted together or woven, like fabric, to form a tape, sheet or tube. In cases where the carbon fibres are woven, the layer of superconductor may be applied to the carbon fibres before or after weaving.

For example, a cable in the form of a woven tape 5 cms. wide by 0.1 cm. thick is made from 10 micron carbon fibres each coated with a layer of niobium/tin 500 A. thick. The packing factor conductor/cable is about 40% and such a cable is capable of carrying a current of about 1800 amps at 100 kilogauss or greater currents at lower magnetic fields.

The weaving of the carbon fibres into a tube is a particularly convenient arrangement, because the tube can form the passage through which liquid helium, or some other suitable cryogenic fluid, is circulated to maintain the superconductor at the necessary low temperature. To form a rigid coil the tube is encapsulated in thermosetting polymeric resin.

The invention is not restricted to the details of the foregoing example. For instance, the superconductor need not necessarily comprise niobium/tin but may comprise some other suitable superconducting material.

I claim:
1. A composite electrical conductor comprising a fibre coated with a layer of superconductor wherein the fibre has a diameter of 5 to 10 microns.
2. A composite electrical conductor comprising a carbon fibre coated with a layer of superconductor wherein the fibre has a diameter of 5 to 10 microns.

References Cited

UNITED STATES PATENTS

| | | | |
|---|---|---|---|
| 3,251,715 | 5/1966 | Miles et al. | 117—217 |
| 3,292,242 | 12/1966 | Giger | 117—227 |

FOREIGN PATENTS

| | | | |
|---|---|---|---|
| 573,002 | 11/1945 | Great Britain | 174—133 |

ALFRED L. LEAVITT, Primary Examiner

C. K. WEIFFENBACH, Assistant Examiner

U.S. Cl. X.R.
29—599; 117—227